United States Patent Office 3,272,735
Patented Sept. 13, 1966

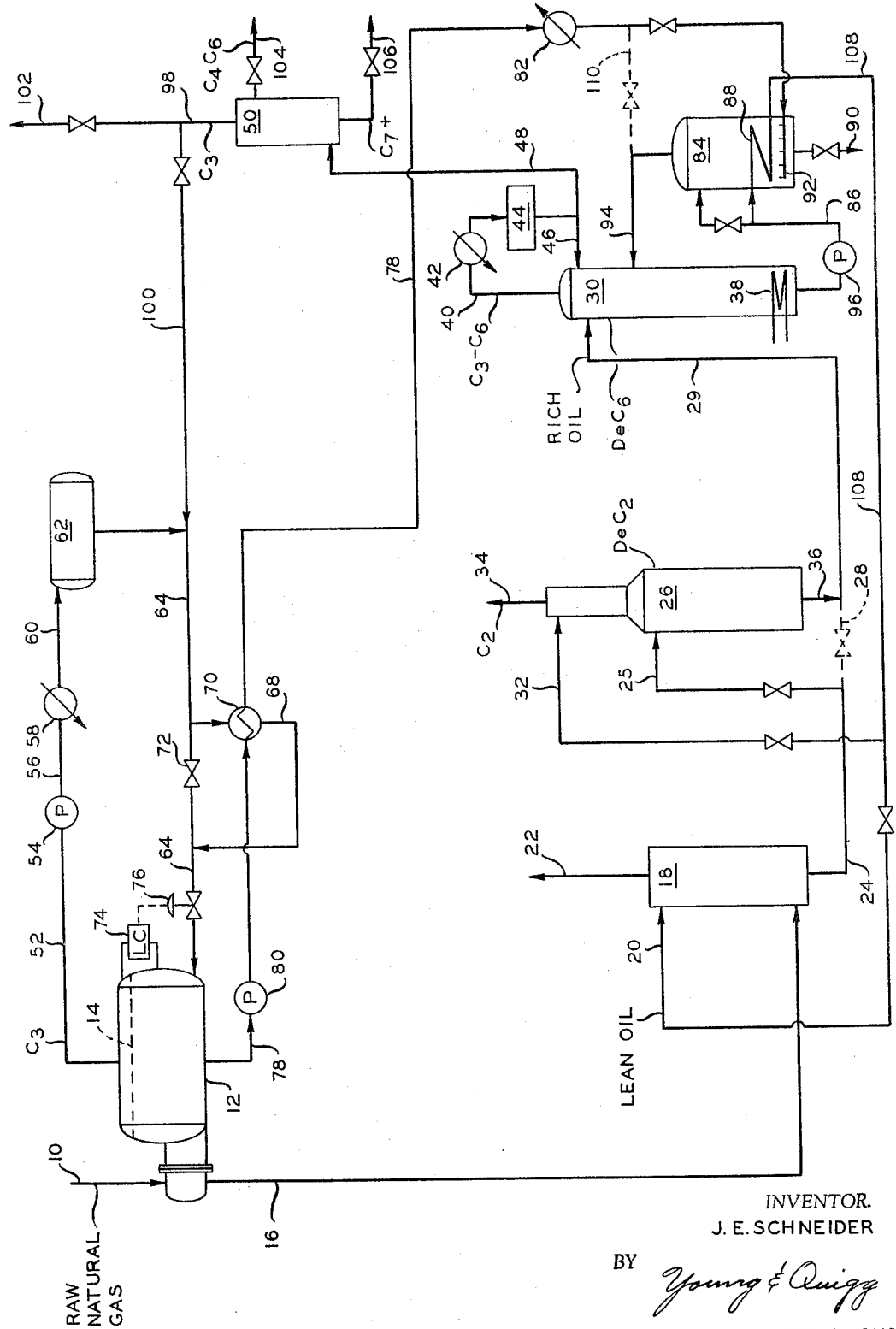

3,272,735
OIL REMOVAL FROM LIQUID REFRIGERANT
Julius E. Schneider, Bartlesville, Okla., assignor to Phillips Petroleum Company, a corporation of Delaware
Filed Feb. 3, 1964, Ser. No. 342,151
9 Claims. (Cl. 208—341)

This invention relates to an improved process for removing oil impurities from a liquid refrigerant such as a liquefied petroleum gas. A specific aspect of the invention relates to the recovery of natural gasoline from natural gas by refrigeration of the natural gas, absorption of natural gasoline therefrom at low temperature with lean oil and processing the rich oil containing natural gasoline and the refrigerant to remove oil impurities therefrom in common recovery equipment.

In recovering natural gasoline from raw natural gas, it is conventional practice to cool the natural gas stream by indirect heat exchange with a normally gaseous liquid refrigerant such as propane. The propane or other liquid refrigerant is maintained in a boiling mass in a compartment in an indirect heat exchanger and the vapors from the boiling refrigerant are compressed, cooled, condensed, and recycled to a lower section of the boiling mass of refrigerant. In this operation oils, such as compressor and/or pump lubricant are picked up in the refrigerant stream being recycled and increase in concentration in the liquid refrigerant where continuous evaporation occurs, i.e., in the boiling compartment of the heat exchanger. The practice in gasoline plants heretofore has been to withdraw liquid refrigerant from the bottom of the evaporator compartment to reduce the concentration of the oil in the refrigerant and discard the withdrawn refrigerant or use the same as low cost fuel.

This invention is concerned with a method of removing oils accumulating in a liquid refrigerant and returning the purified refrigerant to the refrigeration system.

Accordingly, a principal object of the invention is to provide a novel process and apparatus for purifying a liquid refrigerant to remove accumulated oils therefrom, such as a normally gaseous liquefied hydrocarbon. Another object is to provide an improved process and apparatus for the recovery of natural gasoline from natural gas by refrigeration and absorption of the natural gasoline from natural gas with lean oil and purification of the refrigerant and recovery of gasoline boiling range hydrocarbons from the rich oil and simultaneous purification of the refrigerant in the same equipment. A further object is to increase the efficiency and reduce the cost of natural gasoline extraction from a natural gas stream. Other objects of the invention will become apparent to one skilled in the art upon consideration of the accompanying disclosure.

A broad aspect of the invention comprises removing a relatively small stream of the liquid refrigerant from the evaporation compartment of the heat exchanger, heating this stream by indirect heat exchange, and passing the heated stream in vapor form through the recovery equipment utilized in separating the natural gasoline from the rich oil from the absorption step of a natural gasoline recovery operation. In this manner the normally gaseous refrigerant is recovered in the overhead stream from a fractionator along with the gasoline boiling range hydrocarbons (natural gasoline) from which it is separated in conventional manner as a relatively pure stream of refrigerant. An advantageous feature of the invention in more restricted form comprises the step of effecting indirect heat exchange between the stream of refrigerant withdrawn for the purification step with the recycle stream of refrigerant passing to the vaporization compartment. In this manner, heat that would be introduced to the vaporizer is imparted to the purification stream as a portion of the heat required to raise the temperature of this stream before passing the same to the recovery equipment.

A more complete understanding of the invention is obtained by reference to the accompanying schematic drawing which is a flow sheet of the process of the invention illustrating a preferred arrangement of apparatus therefor.

In the drawing the natural gas stream is passed through line 10 through indirect heat exchanger 12 in indirect heat exchange with boiling liquid propane 14. The refrigerated natural gas is passed through line 16 to one or more absorbers 18 for countercurrent contacting with lean oil admitted through line 20. The lean oil absorbs or dissolves gasoline boiling range hydrocarbons therein along with a minor proportion of $C_2$ and $C_3$ hydrocarbons. The denuded gas stream is recovered through line 22 and the rich oil passes through line 24 either through de-ethanizer 26 or through lines 28 and 29 to de-hexanizer 30. The preferred operation is to pass the rich oil through line 25 into de-ethanizer 26 where it is passed in countercurrent contact with lean oil introduced through line 32, the ethane stream being recovered through line 34 and the rich oil passing through line 36 into line 29 for separation in de-hexanizer 30.

De-hexanizer 30 is a conventional separation unit utilized in extracting from a rich oil all of the hydrocarbons having a boiling point of $C_6$ hydrocarbons and lower. Heat for the separation process is provided by steam coil 38. In the process illustrated, $C_3$–$C_6$ hydrocarbons are taken overhead through line 40 through heat exchanger 42 to reduce the temperature thereof and into accumulator 44 from which a portion of the effluent stream is returned to de-hexanizer 30 through line 46 and a remaining portion is passed through line 48 to a fractionator or other hydrocarbon separation means 50.

In the refrigeration step, propane is withdrawn from the vapor space of heat exchanger 12 through line 52 by means of compressor 54 which compresses the propane vapor to a suitable pressure and delivers the compressed vapor through line 56 to a cooler or condenser 58. The cooled stream is passed through line 60 to a surge tank 62. Propane is recycled from tank 62 to the vaporizing compartment of heat exchanger 12 through line 64. A bypass line 68 passes through a heat exchanger 70 around a cutoff valve 72 in line 64. The flow of the recycled propane stream into the vaporizer compartment is controlled by level controller 74 which is in operative control of motor valve 76 in line 64 and maintains a desired liquid level in the compartment.

The purification phase of the process comprises withdrawing a relatively minor stream of liquid propane from the bottom of the evaporation compartment of the exchanger 12 through line 78 by means of pump 80 and passing this stream through heat exchanger 70 in indirect heat exchange with the propane stream in line 68. The warmed purification stream then passes through a heater or heat exchanger 82 from which it passes into an oil reclaimer or stripper 84 to which is fed a lean oil stream through line 86 from the bottom of de-hexanizer 30. Only a minor portion of the lean oil is passed into column 84, the major portion of the lean oil stream being passed through heating coil 88 in the stripper or oil reclaimer to provide the heat for the stripping. Since heavy hydrocarbons accumulate in the lean oil during the process and the lean oil is recycled to the absorption step, the continual passage of a minor portion of this lean oil stream into oil reclaimer 84 removes the heavy undesirable hydrocarbons therefrom and these are periodically removed through line 90 when the liquid level in column 84 becomes relatively high. The propane, containing oil impurities, is bubbled up through the oil in tower 84 through a sparger 92 and this vapor passing upwardly through the oil becomes saturated with lean oil or vaporizes lean oil which then passes with the propane through line 94 into an intermediate section of de-hexanizer 30. The propane from stream 94 is recovered overhead in the $C_3$–$C_6$ stream in line 40 and the lean oil is recovered as a bottom fraction through line 86 by means of pump 96.

Tower 50 is a conventional fractionator or separation unit for the separation of hydrocarbons into selected hydrocarbon streams. Propane is taken overhead through line 98 and any suitable portion thereof for make-up refrigerant is passed through line 100 into line 64 after a cooling step (not shown) or it may be passed into line 52 upstream of compressor 54. Excess propane is recovered for other uses through line 102. The natural gasoline hydrocarbons are recovered through line 104 as a product of the process and the heavies are recovered through line 106.

The lean oil stream egressing from coil 88 is passed through line 108 to line 20 for the absorption step in absorbers 18. A portion of the recycle stream is passed through line 32 into de-ethanizer 26.

It is feasible although not so desirable to pass the propane purification stream from line 78 directly into line 94 and de-hexanizer 30 through line 110 where the oil impurities are recovered from the propane in the lean oil. Even though heavier oils than lean oil are recovered in this manner, the same will be separately recovered through line 90 as the process proceeds because of the purification of a minor stream of the lean oil passing through line 86 into column 84.

The process of the invention essentially as described herein and shown in the drawing is being utilized in the Empress gasoline plant which is the largest natural gasoline plant in the world. This plant processes more than a billion cubic feet of natural gas per day to separate therefrom about 761,760 gallons of natural gasoline per day and residual natural gas amounting to about 968,512,000 standard cubic feet per day. The composition of the stream in line 78 in mole percent is about 99½ percent $C_3$, 0.05 percent $C_2$, 0.35 percent $C_4$, and 0.10 percent oil impurities. This stream is withdrawn from exchanger 12 at the temperature of the liquid therein which is about −43° F. and is heated to about 70° F. by heat exchange in exchanger 70 with the recycled propane, thereby effecting substantial conservation of heat. The stream in line 78 is further heated in heat exchanger 82 to a temperature of about 122° F. and is at a pressure of about 250 p.s.i.g. This stream is then passed upwardly through the oil in oil reclaimer 84 to extract the oil therefrom and carry overhead with it, purified lean oil.

In the plant described, the raw natural gas stream is fed to a pair of heat exchangers 12 and each cooled stream is fed to a recovery system corresponding to that shown in the drawing. The circulation of lean oil in the plant amounts to 2172 gallons per minute, half of which or 1086 g.p.m., passes into a pair of absorbers designated 18 in the drawing. The rich oil liquid stream passing into line 29 from line 36 amounts to 2758 g.p.m., and all but 1352 gallons of this stream is vaporized in a heat exchanger (not shown) in line 29 before passing into de-hexanizer 30. The recovery of gasoline boiling range hydrocarbons from stream 40 is about 1926 g.p.m., which is the gasoline production of the plant. The rate of flow of propane through line 100 to replace the propane removed through line 78 is about 5 g.p.m., the balance of propane being recovered through line 102.

Natural gas from the compressors (not shown) passing through line 10 is at a temperature of about −4° F. and this gas is cooled at the rate of slightly over 500,000,000 s.c.f.d. to a −35° F. which is the temperature of the raw natural gas passing to absorbers 18. The temperature in the vaporization compartment is maintained at about a −43° F. under a pressure of 1.5 p.s.i.g. The propane vapor is compressed and cooled in units 54 and 58 so that the temperature in surge tank 62 is 80° F. and the pressure is 137 p.s.i.g. In normal operation, line 68 carries about 11 g.p.m. through heat exchanger 70 by controlling valve 72. Line 64 carries about 2167 g.p.m. of propane.

Certain modifications of the invention will become apparent to those skilled in the art and the illustrative details disclosed are not to be construed as imposing unnecessary limitations on the invention.

I claim:
1. A process for recovering gasoline boiling range hydrocarbons from natural gas comprising the steps:
    (1) cooling a raw natural gas stream in an indirect heat exchanger with liquid propane as a refrigerant wherein propane is vaporized, compressed, cooled, and pumped back into the heat exchanger with a minor amount of oil impurities picked up from the equipment;
    (2) contacting the cooled natural gas from step (1) with lean oil absorbent to recover a rich oil stream containing hydrocarbons in the gasoline boiling range and $C_2$ and $C_3$ hydrocarbons in minor proportions;
    (3) passing the rich oil from step (2) to a dehexanizer and recovering $C_6$ and lighter hydrocarbons as an overhead stream and hot lean oil as a bottoms stream; and
    (4) withdrawing a minor stream of liquid propane containing oil impurities from the bottom of the heat exchanger of step (1), heating same, and passing the heated propane in vapor form into the dehexanizer of step (3) to separate said oil impurities therefrom and recover the propane in the overhead hydrocarbons.
2. The process of claim 1 including the steps of:
    (5) dividing the lean oil bottoms stream of step (3) into a minor stream and a major stream;
    (6) passing the minor stream of hot lean oil of step (5) into a stripper and passing the propane vapor stream of step (4) upwardly through the hot oil to remove oil impurities therefrom before passing overhead propane into the dehexanizer of step (3); and
    (7) passing the major stream of hot oil of step (5) thru the bottom of the stripper of step (6) in indirect heat exchange with the minor stream of lean oil and propane.
3. The process of claim 1 including the steps of:
    (5) de-ethanizing the rich oil stream from step (2) by contacting same with lean oil to absorb the $C_3$ and heavier and pass the $C_2$ hydrocarbon overhead before passing the remaining rich oil stream to step (3);
    (6) separating the overhead stream from step (3) into a propane fraction and a gasoline fraction; and
    (7) passing the propane fraction of step (6) to the propane refrigerant of step (1).
4. A process comprising the steps of:
    (1) cooling a fluid stream in indirect heat exchange with a normally gaseous boiling mass of liquid hydrocarbon refrigerant;
    (2) compressing and cooling vapors obtained from step (1) and pumping cooled liquid refrigerant back into the boiling liquid in step (1), wherein oil from equipment is picked up by the refrigerant;
    (3) withdrawing a minor liquid stream of refrigerant containing oil from the bottom of said boiling mass and heating and vaporizing same;
    (4) passing a stream of hydrocarbon-rich oil from an oil absorption step into a fractionator to recover hydrocarbons therefrom as an overhead fraction and hot lean oil as a bottoms fraction;
    (5) passing a stream of the hot lean oil bottoms fraction of step (4) into a separation zone;

(6) passing vaporized hydrocarbon refrigerant from step (3) upwardly through the hot lean oil in the separation zone of step (5) to remove the oil from said refrigerant; and (7) passing the effluent refrigerant from step (6) upwardly through the fractionator of step (4) to recover same in said overhead fraction.

5. The process of claim 4 including the steps of:

(8) passing the withdrawn liquid stream of step (3) in indirect heat exchange with the liquid refrigerant of step (2) to further cool said refrigerant and heat said stream;

(9) recovering from the overhead fraction of steps (4) and (7) a refrigerant hydrocarbon fraction; and

(10) combining the recovered fraction of step (9) with the refrigerant in steps (1) and (2).

6. The process of claim 4 wherein said refrigerant is propane; the rich oil of step (4) contains propane and $C_4$ to $C_6$ hydrocarbons; and propane is separated from the overhead fraction of steps (4) and (7) and combined with the refrigerant of steps (1) and (2).

7. Apparatus comprising in combination:

(1) an indirect heat exchanger containing a compartment for a boiling mass of normally liquid refrigerant and a coil therein having an inlet and outlet for a fluid stream to be cooled;

(2) a vapor line connecting with an upper section of said compartment having a compressor therein;

(3) a cooler in the line of (2) downstream of said compressor for cooling said refrigerant;

(4) a surge tank connected with the cooler of (3) to receive cooled refrigerant;

(5) a line connecting a lower section of the surge tank of (4) with the compartment of (1);

(6) means connected with the line of (5) and the compartment of (1) for feeding liquid refrigerant into said compartment to maintain a selected level of liquid refrigerant in said compartment;

(7) a pump in the line of (5);

(8) an effluent line for liquid refrigerant leading from the bottom of the compartment of (1) having a pump and heating means therein;

(9) a contacting chamber for hot lean oil connected with the downstream end of the line of (8) having a hot lean oil inlet for heavy oil, and an overhead outlet for vaporized refrigerant;

(10) a fractionator for separating lean oil as a bottoms product and light hydrocarbons as an overhead product having a rich oil inlet, a lean oil outlet, and an overhead outlet for hydrocarbons; and

(11) conduit means connecting the overhead outlet of (9) with an inlet in the fractionator of (10) at an intermediate level thereof.

8. The apparatus of claim 7 including:

(12) a separation means connected with the overhead outlet of (10) for separation of the overhead fraction into a refrigerant fraction and a residual fraction; and

(13) conduit means for passing the refrigerant fraction of (12) into the compartment of (1).

9. The apparatus of claim 8 including:

(14) an indirect heat exchanger in the effluent line of (8) also connected in the line of (5).

References Cited by the Examiner

UNITED STATES PATENTS

| | | | |
|---|---|---|---|
| 2,627,318 | 2/1953 | Swerdloff | 62—23 X |
| 3,020,723 | 2/1962 | De Lury et al. | 62—40 X |

OTHER REFERENCES

Light Hydrocarbon Recovery and Separation Processes, Petroleum Refiner, vol. 28, No. 9, September 1949, pages 213–240.

NORMAN YUDKOFF, *Primary Examiner.*

V. W. PRETKA, *Assistant Examiner.*